United States Patent
Ye et al.

(10) Patent No.: US 10,887,788 B2
(45) Date of Patent: Jan. 5, 2021

(54) DEVICE AND METHOD OF HANDLING SCHEDULING REQUESTS FOR LOGICAL CHANNELS

(71) Applicant: HTC Corporation, Taoyuan (TW)

(72) Inventors: Shiang-Rung Ye, Taoyuan (TW); Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/191,454

(22) Filed: Nov. 15, 2018

(65) Prior Publication Data
US 2019/0150024 A1 May 16, 2019

Related U.S. Application Data

(60) Provisional application No. 62/587,444, filed on Nov. 16, 2017.

(51) Int. Cl.
*H04W 28/02* (2009.01)
*H04W 72/12* (2009.01)

(52) U.S. Cl.
CPC ... *H04W 28/0278* (2013.01); *H04W 72/1205* (2013.01); *H04W 72/1278* (2013.01); *H04W 72/1242* (2013.01)

(58) Field of Classification Search
CPC ......... H04W 28/0278; H04W 72/1278; H04W 72/1205; H04W 72/1242
See application file for complete search history.

(56) References Cited

U.S. PATENT DOCUMENTS

| | | | |
|---|---|---|---|
| 9,295,077 B2 | 3/2016 | Guo | |
| 2014/0064219 A1* | 3/2014 | Quan | H04W 72/1284 370/329 |
| 2017/0295590 A1 | 10/2017 | Loehr | |
| 2017/0310531 A1 | 10/2017 | Dinan | |
| 2018/0310308 A1* | 10/2018 | Loehr | H04W 72/0446 |
| 2018/0324635 A1* | 11/2018 | Babaei | H04W 24/10 |

(Continued)

FOREIGN PATENT DOCUMENTS

WO 2014/003327 A1 1/2014

OTHER PUBLICATIONS

Search Report dated Feb. 18, 2019 for EP application No. 18206573.0, pp. 1-6.

(Continued)

*Primary Examiner* — Walli Z Butt
(74) *Attorney, Agent, or Firm* — Winston Hsu (57) ABSTRACT

A communication device for handling scheduling requests (SRs) for logical channels comprises at least one processing circuit configured to execute instructions of: receiving a configuration of a first logical channel, a configuration of a second logical channel, a first SR configuration associated to the first logical channel and a second SR configuration associated to the second logical channel; when a priority of the first logical channel is higher than or equal to a priority of the second logical channel and the first logical channel has first data becoming available for a first data transmission, triggering a first buffer status reporting (BSR) and a first scheduling request (SR) for the first BSR and transmitting the first SR according to the first SR configuration; and when the first logical channel is released, canceling the first SR.

10 Claims, 7 Drawing Sheets

(56) References Cited

U.S. PATENT DOCUMENTS

2018/0368156 A1* 12/2018 Agiwal ............ H04W 72/0446
2019/0075579 A1* 3/2019 Wang ................ H04W 72/1242

OTHER PUBLICATIONS

3GPP TS 36.321 V14.2.1 (Mar. 2017), "3rd Generation Partnership Project; Technical Specification Group Radio Access Network; Evolved Universal Terrestrial Radio Access (E-UTRA); Medium Access Control (MAC) protocol specification (Release 14)", XP051298198, pp. 1-106.
Huawei, HiSilicon, "SR triggering and cancellation", 3GPP TSG-RAN WG2 #98, R2-1705198, May 15-19, 2017, Hangzhou, China, XP051275674, pp. 1-3.
Office action dated Jul. 3, 2019 for the Taiwan application No. 107140826, filing date Nov. 16, 2018, pp. 1-8.
Agenda Item: 2.2 Source: ETSI MCC Title: Report of 3GPP TSG RAN2#99 meeting, Berlin, Germany, Oct. 2017.
Agenda Item: 2.2 Source: ETSI MCC Title: Report of 3GPP TSG RAN2#99bis meeting, Prague, Czech Republic, Nov. 2017.
Agenda Item: 2.2 Source: ETSI MCC Title: Report of 3GPP TSG RAN WG2 NR AdHoc#2 meeting, Qingdao, China, Aug. 2017.
Agenda Item: 2.2 Source: ETSI MCC Title: Report of 3GPP TSG RAN2#98 meetinng, Hangzhou, China, Aug. 2017.
Agenda Item: 2.2 Source: ETSI MCC Title: Report of 3GPP TSG RAN2 meeting #97bis, Spokane, USA, May 2017.
Agenda Item: 2.2 Source: ETSI MCC Title: Report of 3GPP TSG RAN WG2 meeting #97, Athens, Greece, Apr. 2017.
Agenda Item: 2.2 Source: ETSI MCC Title: Report of 3GPP TSG RAN WG2 AdHoc on NR, Feb. 2017.
3GPP TS 36.321 V14.4.0 (Sep. 2017) Technical Specification 3rd Generation Partnership Project; Technical Specification Group Radio Access Network; Evolved Universal Terrestrial Radio Access (E-UTRA); Medium Access Control (MAC) protocol specification (Release 14).
3GPP TR 38.804 V14.0.0 (Mar. 2017) Technical Report 3rd Generation Partnership Project; Technical Specification Group Radio Access Network; Study on New Radio Access Technology; Radio Interface Protocol Aspects (Release 14).
3GPP TR 38.913 V14.3.0 (Jun. 2017) Technical Report 3rd Generation Partnership Project; Technical Specification Group Radio Access Network; Study on Scenarios and Requirements for Next Generation Access Technologies; (Release 14).
3GPP TR 22.862 V14.1.0 (Sep. 2016) Technical Report 3rd Generation Partnership Project; Technical Specification Group Services and System Aspects; Feasibility Study on New Services and Markets Technology Enablers for Critical Communications; Stage 1 (Release 14).

* cited by examiner

DEVICE AND METHOD OF HANDLING SCHEDULING REQUESTS FOR LOGICAL CHANNELS

CROSS REFERENCE TO RELATED APPLICATIONS

This application claims the benefits of U.S. Provisional Applications No. 62/587,444 filed on Nov. 16, 2017, which is incorporated herein by reference.

BACKGROUND OF THE INVENTION

1. Field of the Invention

The present invention relates to a device and a method used in a wireless communication system, and more particularly, to a device and a method of handling scheduling requests for logical channels.

2. Description of the Prior Art

3rd Generation Partnership Project (3GPP) continues improving a long-term evolution (LTE) system by introducing carrier aggregation (CA), Dual Connectivity (DC), LTE transmission over an unlicensed spectrum (LTE-unlicensed (LTE-U) or licensed-assisted access (LAA)). 3GPP recently starts developing a next generation cellular system called a new radio (NR) system or a next generation (NextGen) system. Accordingly, Inter-system mobility between the LTE system and the NR/NextGen system should be solved, to provide seamless service continuity for a user equipment (UE) moving between the two systems.

SUMMARY OF THE INVENTION

The present invention therefore provides a method and related communication device for handling scheduling requests for logical channels to solve the abovementioned problem.

A communication device for handling scheduling requests (SRs) for logical channels comprises at least one storage device; and at least one processing circuit, coupled to the at least one storage device. The at least one storage device stores, and the at least one processing circuit is configured to execute instructions of:
receiving a configuration of a first logical channel, a configuration of a second logical channel, a first SR configuration associated to the first logical channel and a second SR configuration associated to the second logical channel; when a priority of the first logical channel is higher than or equal to a priority of the second logical channel and the first logical channel has first data becoming available for a first data transmission, triggering a first buffer status reporting (BSR) and a first scheduling request (SR) for the first BSR and transmitting the first SR according to the first SR configuration; and when the first logical channel is released, canceling the first SR.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
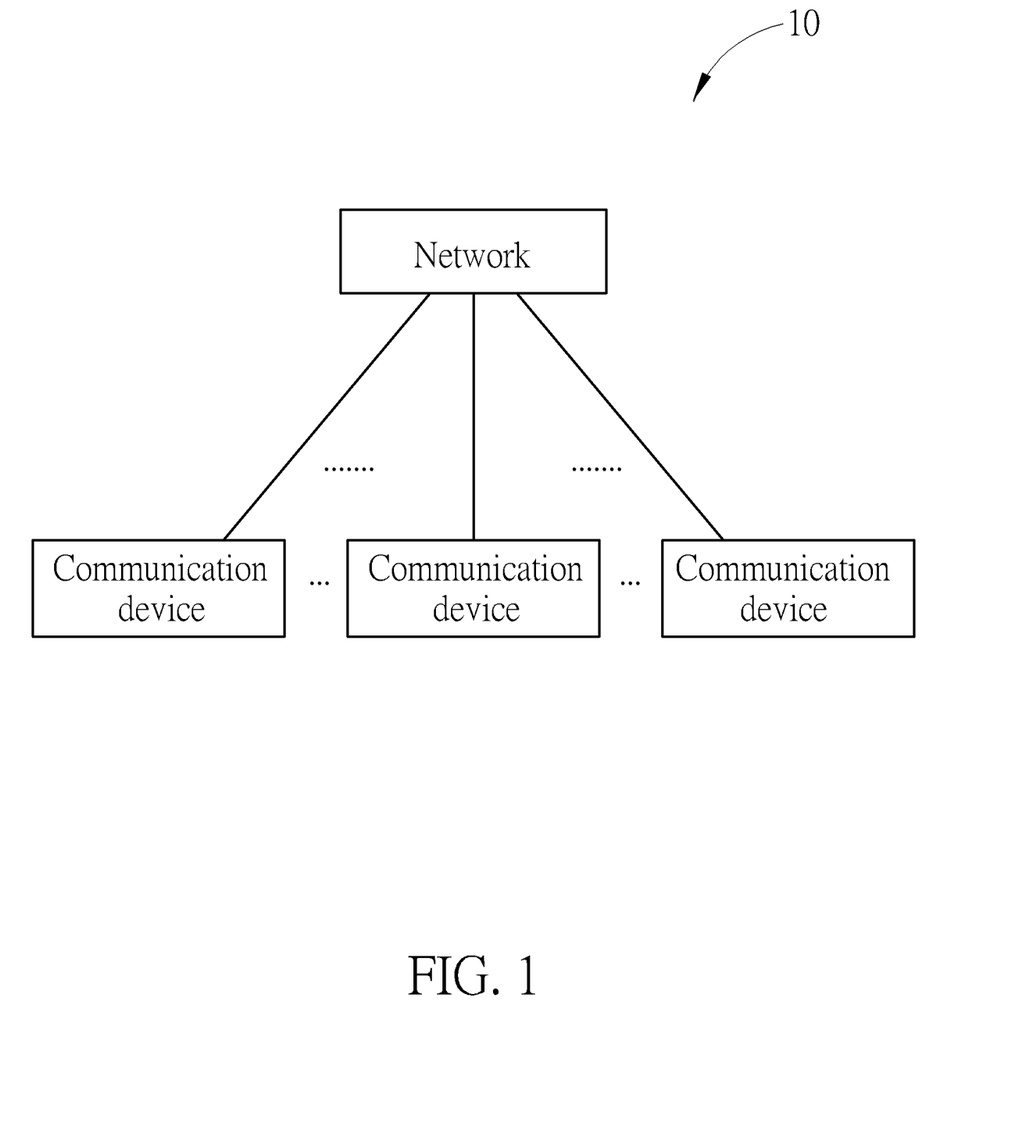
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may simultaneously communicate with each other via one or multiple cells (e.g., multiple carriers) belonging to one or multiple base stations (BSs). The abovementioned cells may be operated in the same or different duplexing modes, e.g., frequency-division duplexing (FDD), time-division duplexing (TDD) or flexible duplexing.

In FIG. 1, the network and the communication devices are simply utilized for illustrating the structure of the wireless communication system 10. Practically, the network includes at least one of a long-term evolution (LTE) network and a new radio (NR)/next generation (NextGen) network. The LTE network may include an evolved universal terrestrial radio access network (E-UTRAN) including at least one evolved NB (eNB) and an Evolved Packet Core (EPC). The at least one eNB connects to the EPC. The NR/NextGen network may include a 5G (or called NR) radio access network including at least one of a 5G BS (or called gNB) and a NextGen Core (NGC). The 5G BS connects to the NGC. An eLTE eNB is an evolution of an eNB that supports connectivity to the NGC. In this case, the eLTE eNB may be considered in the LTE network or the NR/NextGen network. The 5G radio communication technology may employ orthogonal frequency-division multiplexing (OFDM) and/or non-OFDM, and transmission time interval (TTI) shorter than 1 ms (e.g., 1, 2, 3 or 4 OFDM symbols, 100, or 200 us) for communicating between the communication devices and the 5G BS.

A communication device may be a user equipment (UE), a narrowband Internet of Things (NB-IoT) UE, a machine type communication (MTC) device, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for a UL, the communication device is the transmitter and the network is the receiver, and for a DL, the network is the transmitter and the communication device is the receiver.

Figure 2:
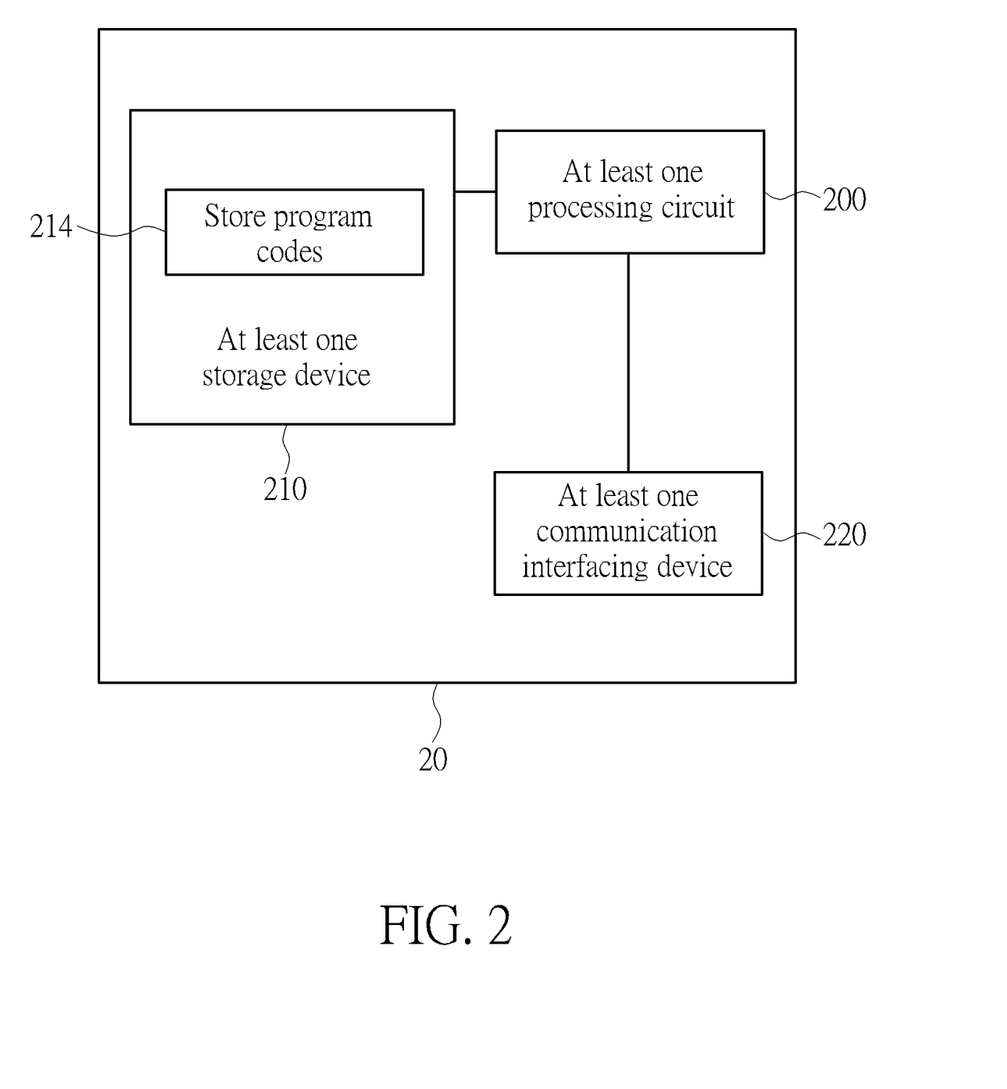
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 includes at least one transceiver and is used to transmit and receive signals (e.g., data, messages and/or packets) according to processing results of the at least one processing circuit 200.

In the following examples, a UE is used to represent a communication device in FIG. 1, to simplify the illustration of the embodiments.

When a scheduling request (SR) is triggered, it is assumed that the SR is only triggered by a regular buffer status reporting (BSR), e.g., a higher priority data arrival and a retransmission BSR. For the regular BSR triggered by the higher priority data arrival, a SR configuration usable for a SR procedure is the SR configuration mapped to a logic channel that triggers the BSR. However, in the case there is no usable SR configuration, the UE's behavior is unknown.

Figure 3:
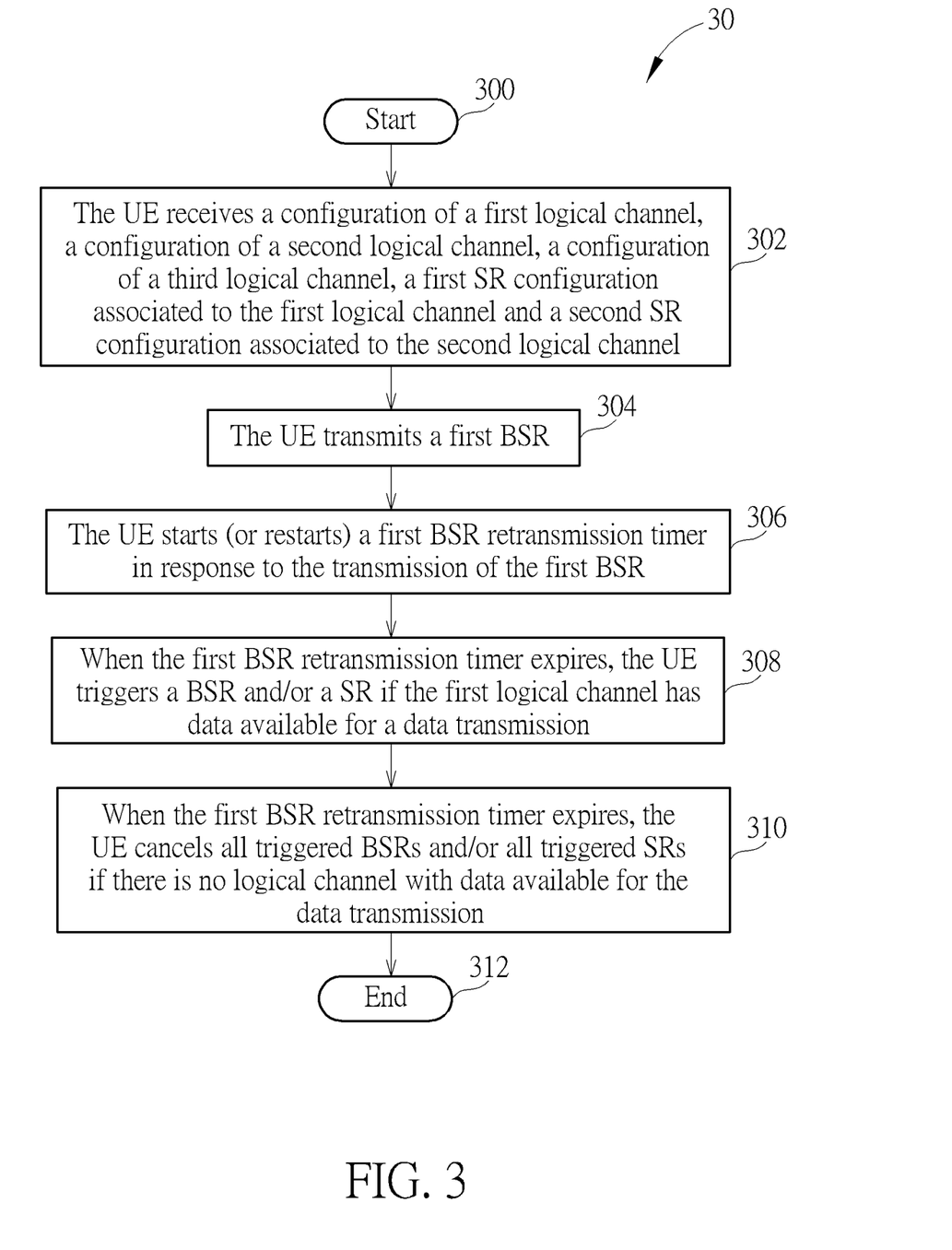
FIG. 3 is a flowchart of a process according to an example of the present invention.

A process 30 in FIG. 3 may be utilized in a UE (e.g., a communication device in FIG. 1), and includes the following steps:

Step 300: Start.

Step 302: The UE receives a configuration of a first logical channel, a configuration of a second logical channel, a configuration of a third logical channel, a first SR configuration associated to the first logical channel and a second SR configuration associated to the second logical channel.

Step 304: The UE transmits a first BSR.

Step 306: The UE starts (or restarts) a first BSR retransmission timer in response to the transmission of the first BSR.

Step 308: When the first BSR retransmission timer expires, the UE triggers a BSR and/or a SR if the first logical channel has data available for a data transmission.

Step 310: When the first BSR retransmission timer expires, the UE cancels all triggered BSRs and/or all triggered SRs if there is no logical channel with data available for the data transmission.

Step 312: End.

In one example, a triggered SR is equivalent to (or simply is) a pending SR.

In one example, when the first BSR retransmission timer expires, the UE cancels all triggered BSR and/or SRs, if the first logical channel and the second logical channel have been released but the third logical channel has not been released.

In one example, a SR configuration (e.g., any of the above SR configurations) used for transmitting a SR is mapped to a highest-priority logical channel that has data pending for a data transmission.

In one example, one of the SR configurations mapped to a logical channel with data pending for a data transmission can be used for transmitting a SR.

In one example, one of the SR configurations mapped to a logical channel can be used for transmitting a SR.

In one example, a SR configuration includes at least one physical UL control channel (PUCCH) resource for a SR transmission.

Figure 4:
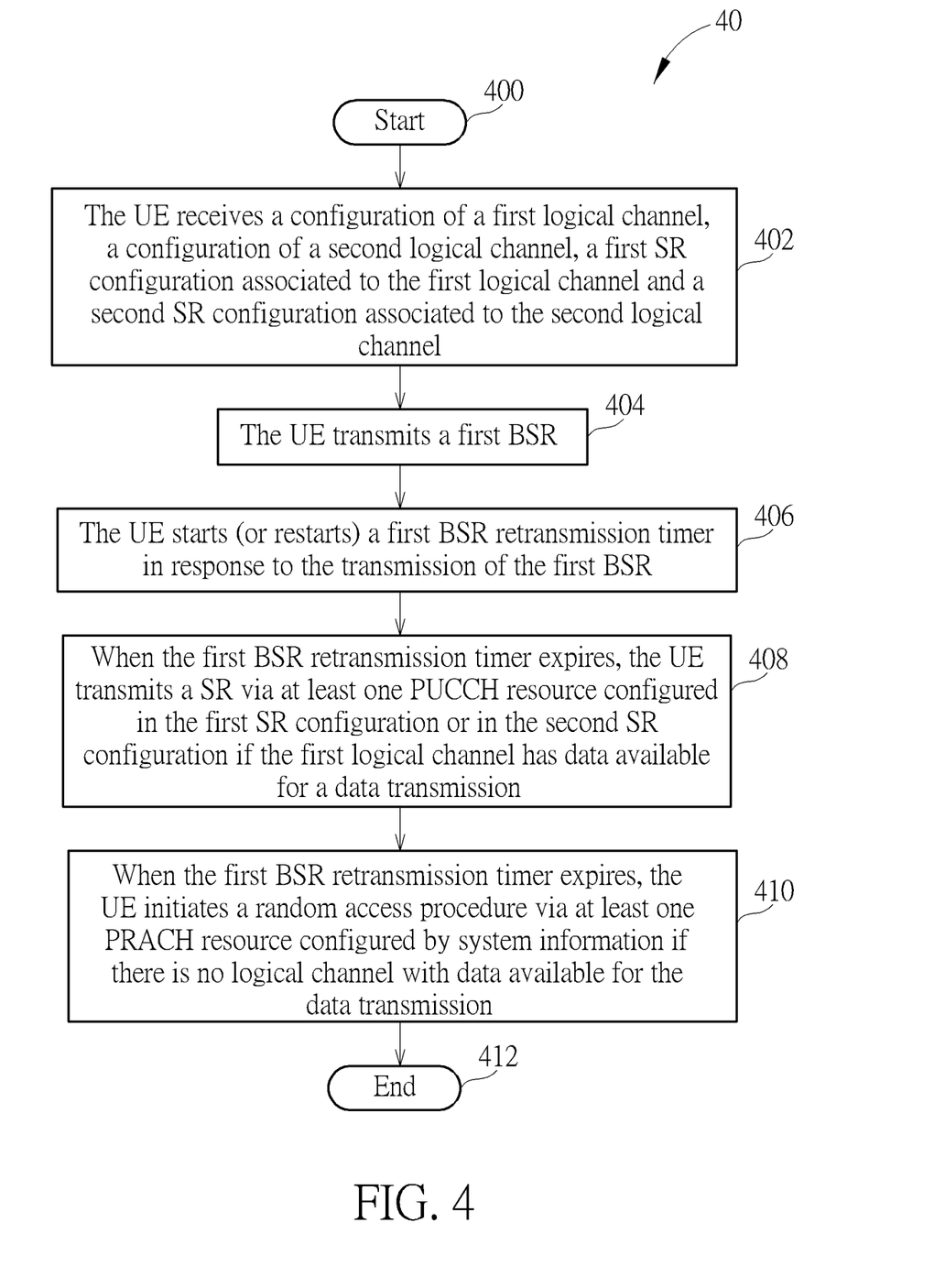
FIG. 4 is a flowchart of a process according to an example of the present invention.

A process 40 in FIG. 4 may be utilized in a UE (e.g., a communication device in FIG. 1), and includes the following steps:

Step 400: Start.

Step 402: The UE receives a configuration of a first logical channel, a configuration of a second logical channel, a first SR configuration associated to the first logical channel and a second SR configuration associated to the second logical channel.

Step 404: The UE transmits a first BSR.

Step 406: The UE starts (or restarts) a first BSR retransmission timer in response to the transmission of the first BSR.

Step 408: When the first BSR retransmission timer expires, the UE transmits a SR via at least one PUCCH resource configured in the first SR configuration or in the second SR configuration if the first logical channel has data available for a data transmission.

Step 410: When the first BSR retransmission timer expires, the UE initiates a random access procedure via at least one physical random access channel (PRACH) resource configured by system information if there is no logical channel with data available for the data transmission.

Step 412: End.

In one example, a SR configuration used for transmitting a SR is mapped to a highest-priority logical channel that has data pending for a data transmission.

In one example, one of the SR configurations mapped to a logical channel with data pending for a data transmission can be used for transmitting a SR.

In one example, one of the SR configurations mapped to a logical channel can be used for transmitting a SR.

In one example, a SR configuration includes at least one PUCCH resource for a SR transmission.

When a high-priority logical channel has data pending for a data transmission, a low-priority logical channel cannot trigger a BSR/SR. If a logical channel does not trigger a BSR while the logic channel has data pending in a buffer, a SR configuration of the logic channel is not usable. However, in a case if a high-priority logical channel and its SR configuration are released (e.g., due to a bear type change), there may be no usable SR configuration for the SR configuration. In that case, if other logical channel (s) has data to send but does not trigger a BSR, behavior of the UE (e.g., a medium access control (MAC) of the UE) is unknown.

Figure 5:
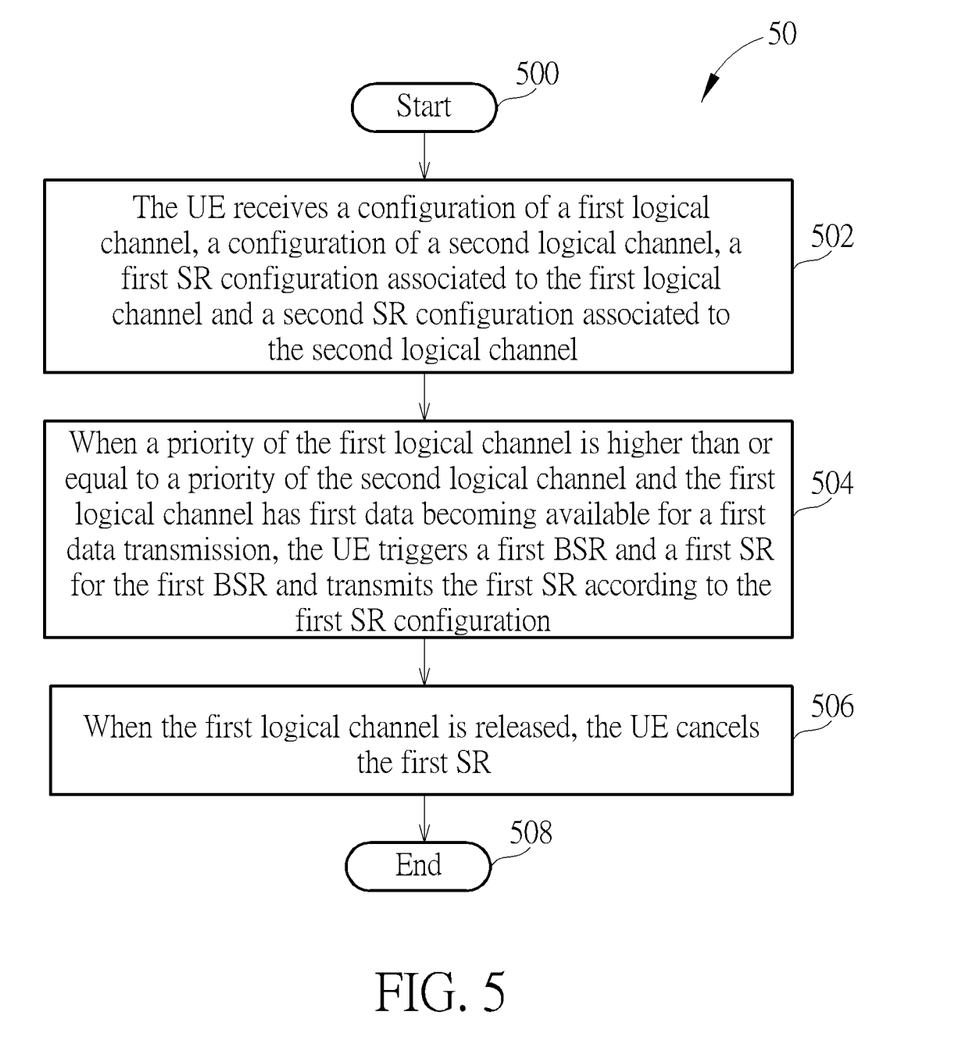
FIG. 5 is a flowchart of a process according to an example of the present invention.

A process 50 in FIG. 5 may be utilized in a UE (e.g., a communication device in FIG. 1), and includes the following steps:

Step 500: Start.

Step 502: The UE receives a configuration of a first logical channel, a configuration of a second logical channel, a first SR configuration associated to the first logical channel and a second SR configuration associated to the second logical channel.

Step 504: When a priority of the first logical channel is higher than or equal to a priority of the second logical channel and the first logical channel has first data becoming available for a first data transmission, the UE triggers a first BSR and a first SR for the first BSR and transmits the first SR according to the first SR configuration.

Step 506: When the first logical channel is released, the UE cancels the first SR.

Step 508: End.

In one example, when the first logical channel is released, the UE further cancels the first BSR.

In one example, a triggered SR is equivalent to (or simply is) a pending SR.

In one example, a SR configuration includes at least one physical UL control channel (PUCCH) resource for a SR transmission.

In one example, the first logical channel is released may means no valid PUCCH resource for a SR transmission.

Figure 6:
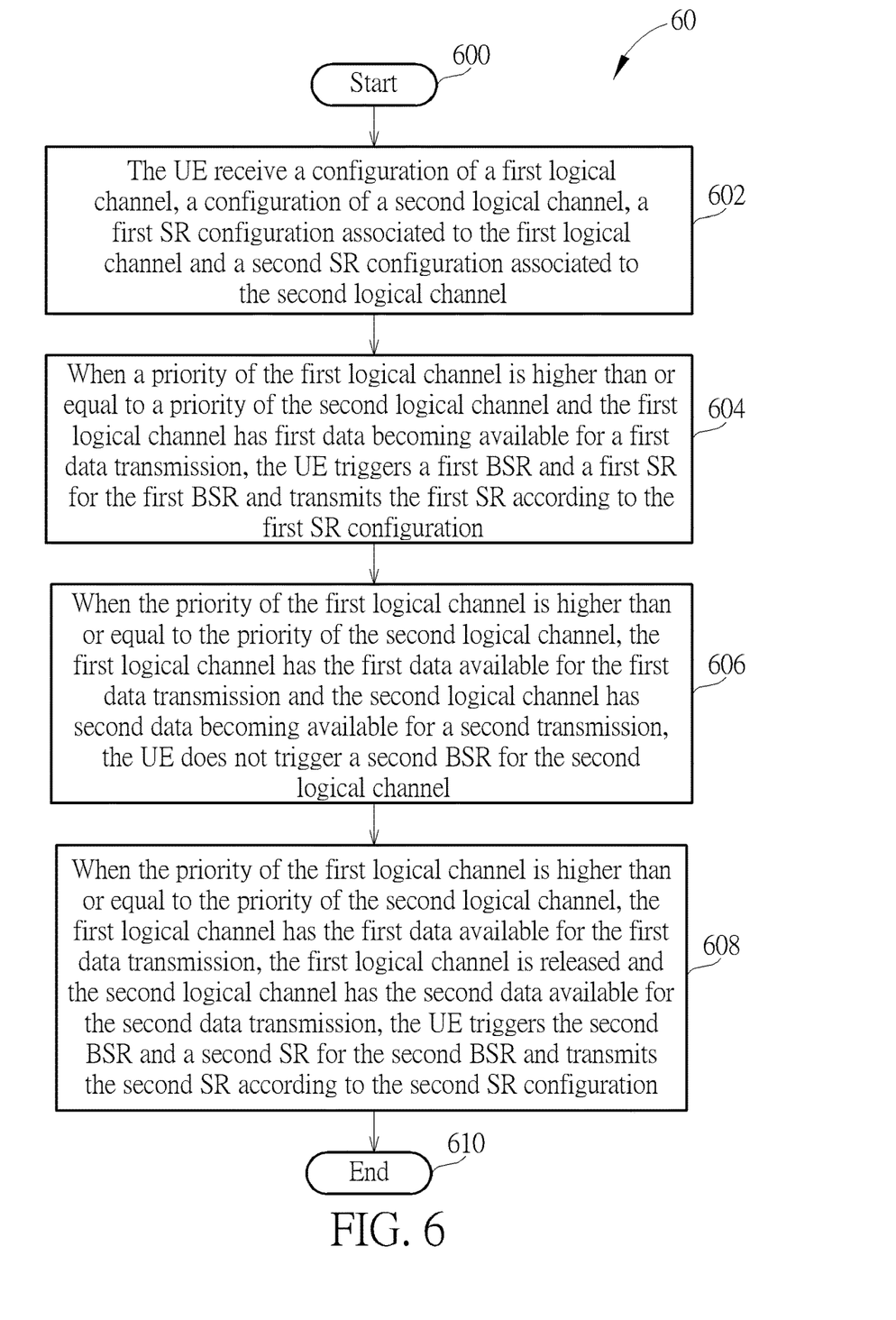
FIG. 6 is a flowchart of a process according to an example of the present invention.

A process 60 in FIG. 6 may be utilized in a UE (e.g., a communication device in FIG. 1), and includes the following steps:

Step 600: Start.

Step 602: The UE receive a configuration of a first logical channel, a configuration of a second logical channel, a first SR configuration associated to the first logical channel and a second SR configuration associated to the second logical channel.

Step 604: When a priority of the first logical channel is higher than or equal toa priority of the second logical channel and the first logical channel has first data becoming available for a first data transmission, the UE triggers a first BSR and a first SR for the first BSR and transmits the first SR according to the first SR configuration.

Step 606: When the priority of the first logical channel is higher than or equal to the priority of the second logical channel, the first logical channel has the first data available for the first data transmission and the second logical channel has second data becoming available for a second transmission, the UE does not trigger a second BSR for the second logical channel.

Step 608: When the priority of the first logical channel is higher than or equal to the priority of the second logical channel, the first logical channel has the first data available for the first data transmission, the first logical channel is released and the second logical channel has the second data available for the second data transmission, the UE triggers the second BSR and a second SR for the second BSR and transmits the second SR according to the second SR configuration.

Step 610: End.

Figure 7:
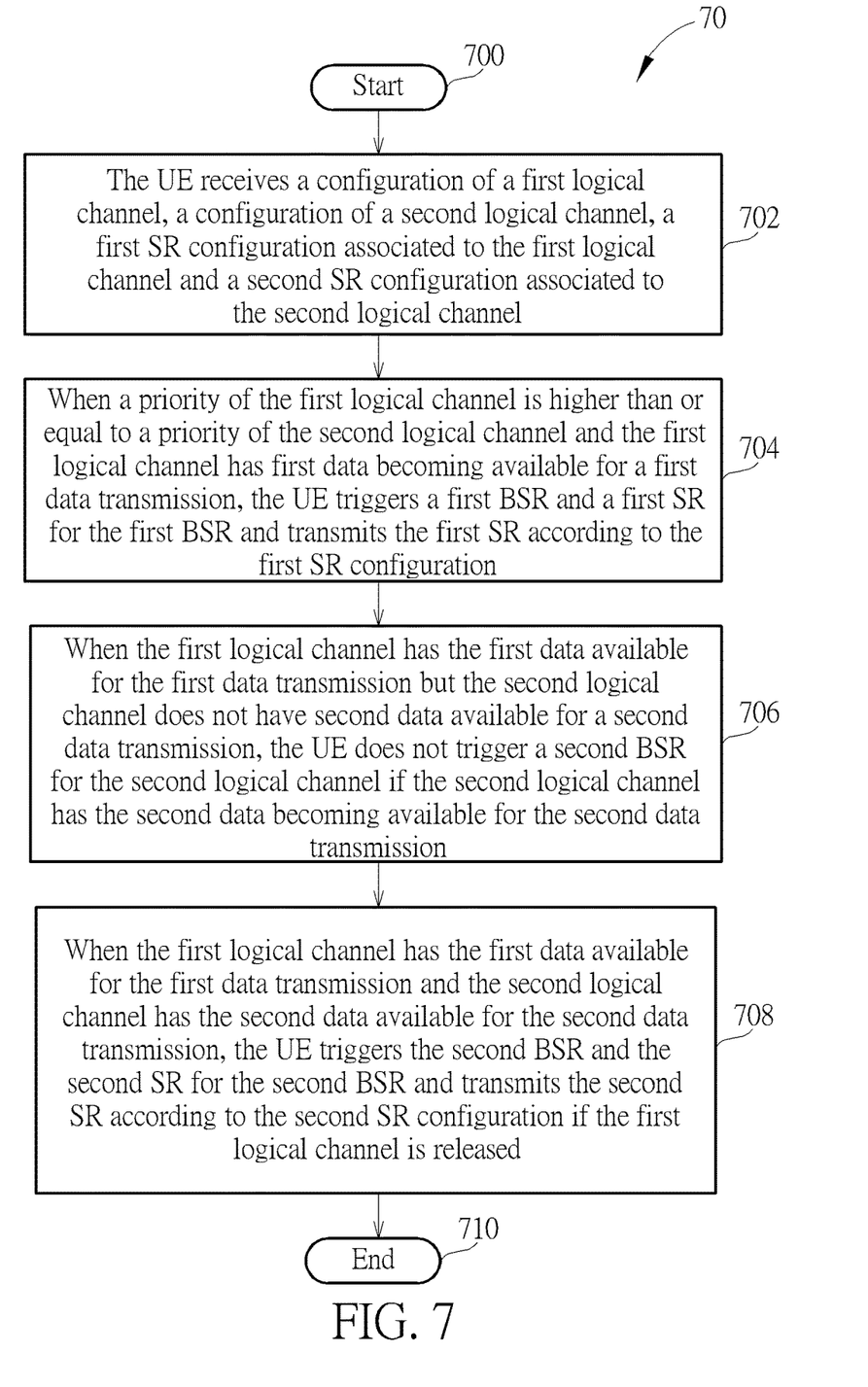
FIG. 7 is a flowchart of a process according to an example of the present invention.

A process 70 in FIG. 7 may be utilized in a UE (e.g., a communication device in FIG. 1), and includes the following steps:

Step 700: Start.

Step 702: The UE receives a configuration of a first logical channel, a configuration of a second logical channel, a first SR configuration associated to the first logical channel and a second SR configuration associated to the second logical channel.

Step 704: When a priority of the first logical channel is higher than or equal to a priority of the second logical channel and the first logical channel has first data becoming available for a first data transmission, the UE triggers a first BSR and a first SR for the first BSR and transmits the first SR according to the first SR configuration.

Step 706: When the first logical channel has the first data available for the first data transmission but the second logical channel does not have second data available for a second data transmission, the UE does not trigger a second BSR for the second logical channel if the second logical channel has the second data becoming available for the second data transmission.

Step 708: When the first logical channel has the first data available for the first data transmission and the second logical channel has the second data available for the second data transmission, the UE triggers the second BSR and the second SR for the second BSR and transmits the second SR according to the second SR configuration if the first logical channel is released.

Step 710: End.

It should be noted that although the above examples are illustrated to clarify the related operations of corresponding processes. The examples can be combined and/or modified arbitrarily according to system requirements and/or design considerations. Message names and information element (IE) names described above are examples and should not narrow a scope of the present invention.

Those skilled in the art should readily make combinations, modifications and/or alterations on the abovementioned description and examples. For example, the skilled person easily makes new embodiments of the network based on the embodiments and examples of the UE or the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides a method and a communication device for handling SRs for logical channels. Behavior of the communication device is defined according to priorities and states of the logical channels. Thus, the communication device can communicate with a network regularly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling scheduling requests (SRs) for logical channels, comprising:
   at least one storage device; and
   at least one processing circuit, coupled to the at least one storage device, wherein the at least one storage device stores, and the at least one processing circuit is configured to execute instructions of:
   receiving a configuration of a first logical channel, a configuration of a second logical channel, a first SR configuration associated to the first logical channel and a second SR configuration associated to the second logical channel;
   when a priority of the first logical channel is higher than or equal to a priority of the second logical channel and the first logical channel has first data becoming available for a first data transmission, triggering a first buffer status reporting (BSR) and a first scheduling request (SR) for the first BSR and transmitting the first SR according to the first SR configuration; and
   when the first logical channel is released, canceling the first SR and the first BSR.

2. The communication device of claim 1, wherein the first SR is a pending SR.

3. The communication device of claim 1, wherein the first SR configuration comprises at least one physical UL control channel (PUCCH) resource for transmitting the first SR.

4. The communication device of claim 1, wherein the instructions further comprise:
   when the priority of the first logical channel is higher than or equal to the priority of the second logical channel, the first logical channel has the first data available for the first data transmission and the second logical channel has second data becoming available for a second data transmission, not triggering a second BSR for the second logical channel; and when the priority of the first logical channel is higher than or equal to the priority of the second logical channel, the first logical channel has the first data available for the first data transmission, the first logical channel is released and the second logical channel has the second data available for the second data transmission, triggering the second BSR and a second SR for the second BSR and transmitting the second SR according to the second SR configuration.

5. The communication device of claim 1, wherein the instructions further comprise:

when the first logical channel has the first data available for the first data transmission but the second logical channel does not have second data available for a second data transmission, not triggering a second BSR for the second logical channel if the second logical channel has the second data becoming available for the second data transmission; and when the first logical channel has the first data available for the first data transmission and the second logical channel has the second data available for the second data transmission, triggering the second BSR and a second SR for the second BSR and transmitting the second SR according to the second SR configuration if the first logical channel is released.

6. A method for handling scheduling requests (SRs) for logical channels for a communication device, comprising steps of:

receiving a configuration of a first logical channel, a configuration of a second logical channel, a first SR configuration associated to the first logical channel and a second SR configuration associated to the second logical channel;

when a priority of the first logical channel is higher than or equal to a priority of the second logical channel and the first logical channel has first data becoming available for a first data transmission, triggering a first buffer status reporting (BSR) and a first scheduling request (SR) for the first BSR and transmitting the first SR according to the first SR configuration; and when the first logical channel is released, canceling the first SR and the first BSR.

7. The method of claim 6, wherein the first SR is a pending SR.

8. The method of claim 6, wherein the first SR configuration comprises at least one physical UL control channel (PUCCH) resource for transmitting the first SR.

9. The method of claim 6, wherein the steps further comprise:

when the priority of the first logical channel is higher than or equal to the priority of the second logical channel, the first logical channel has the first data available for the first data transmission and the second logical channel has second data becoming available for a second data transmission, not triggering a second BSR for the second logical channel; and when the priority of the first logical channel is higher than or equal to the priority of the second logical channel, the first logical channel has the first data available for the first data transmission, the first logical channel is released and the second logical channel has the second data available for the second data transmission, triggering the second BSR and a second SR for the second BSR and transmitting the second SR according to the second SR configuration.

10. The method of claim 6, wherein the steps further comprise:

when the first logical channel has the first data available for the first data transmission but the second logical channel does not have second data available for a second data transmission, not triggering a second BSR for the second logical channel if the second logical channel has the second data becoming available for the second data transmission; and when the first logical channel has the first data available for the first data transmission and the second logical channel has the second data available for the second data transmission, triggering the second BSR and a second SR for the second BSR and transmitting the second SR according to the second SR configuration if the first logical channel is released.

* * * * *